K. SCHEINER.
CYCLE FRAME.
APPLICATION FILED APR. 9, 1918.

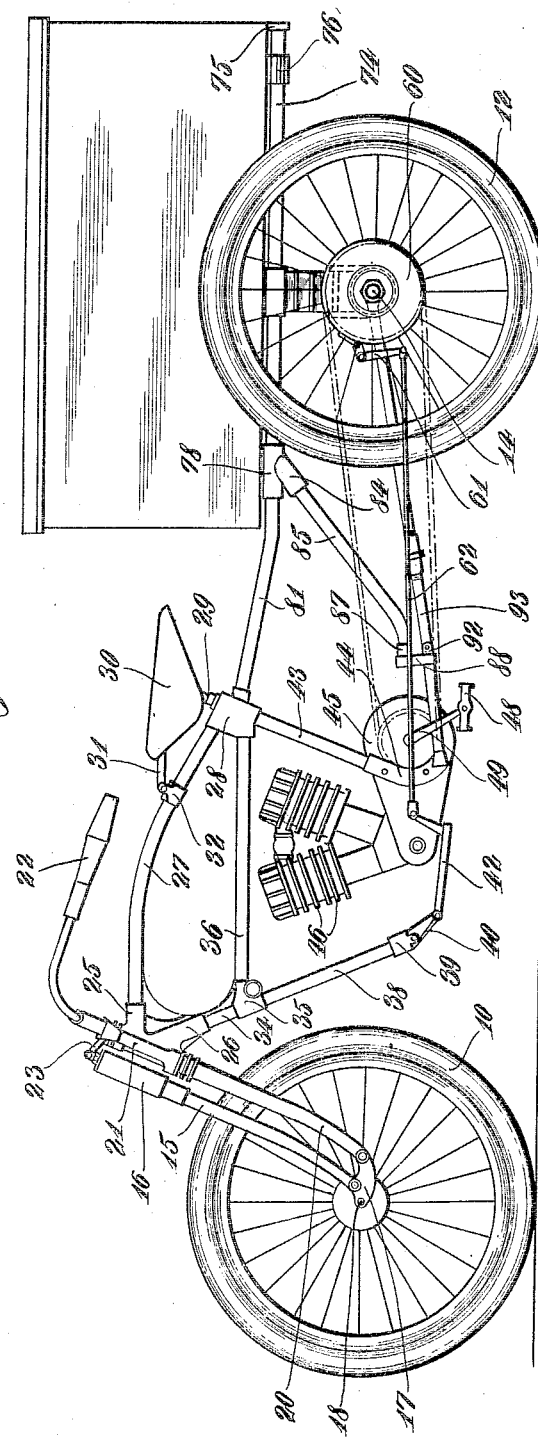

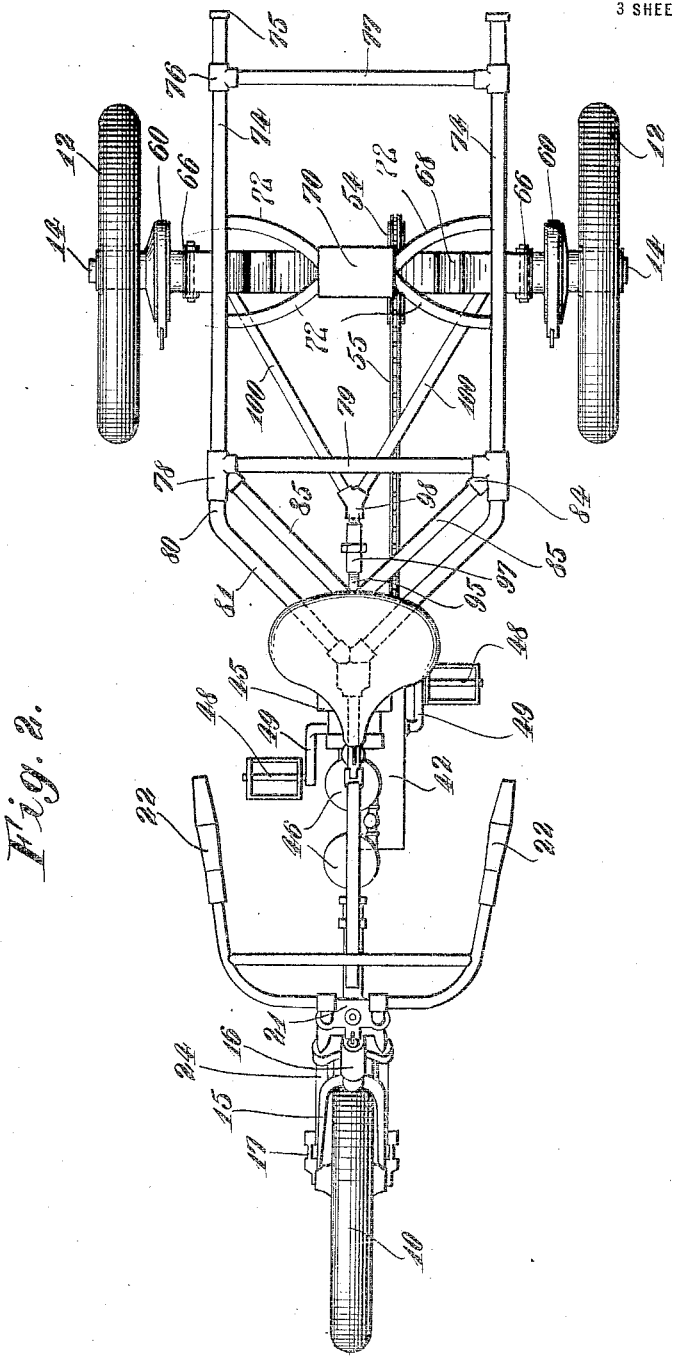

1,309,305.

Patented July 8, 1919.
3 SHEETS—SHEET 3.

INVENTOR
Karl Scheiner
BY
Oscar Geier
HIS ATTORNEY

UNITED STATES PATENT OFFICE.

KARL P. SCHEINER, OF BROOKLYN, NEW YORK.

CYCLE-FRAME.

1,309,305.  Specification of Letters Patent.  Patented July 8, 1919.

Application filed April 9, 1918. Serial No. 227,554.

*To all whom it may concern:*

Be it known that I, KARL P. SCHEINER, a citizen of the United States, residing at Brooklyn, county of Queens, and State of New York, have invented certain new and useful Improvements in Cycle-Frames, of which the following is a specification.

This invention relates to improvements in vehicle frames and particularly to types known as cycles adapted to be operated pedally or by power.

The principal object of the invention is to provide a novel form of frame, applicable to a motor-cycle, permitting the same to be used as a passenger car or goods carrier.

A further object is to provide additional parts which may be applied to standard types of ordinary cycle frames metamorphosing the cycle into carrier of increased capacity.

A still further object is to provide a frame comprised of relatively few and simple parts, designed for strength and lightness and which presents a neat appearance.

These and other like objects are attained by the novel construction and combination of parts hereinafter described and shown in the accompanying drawings, forming a material part of this disclosure and in which:—

Figure 1 is a side elevational view showing a complete motor-cycle arranged as a goods carrier and made in accordance with the invention.

Fig. 2 is a top plan view thereof, the goods receptacle having been removed.

Figure 4:
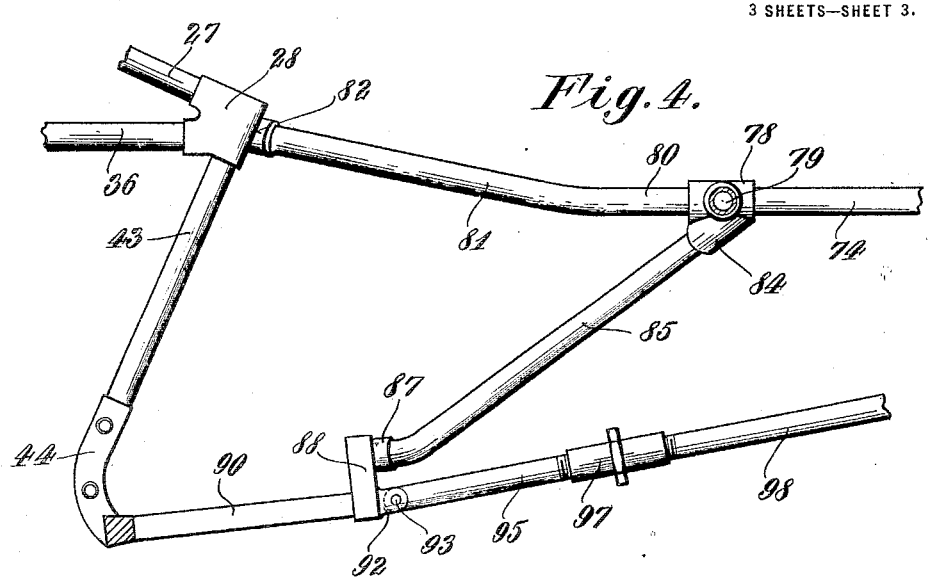
Fig. 4 is an enlarged side elevational view showing the novel construction of the frame.
Figure 3:
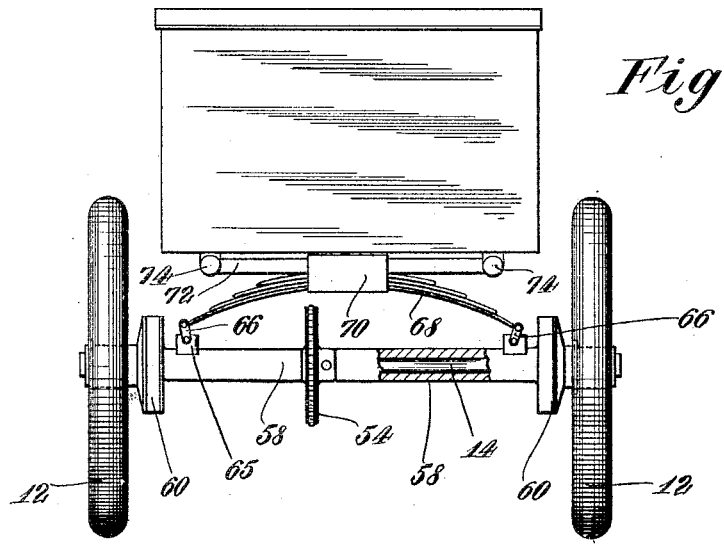
Fig. 3 is a rear elevational view of the cycle, partially shown in the section.
Figure 5:
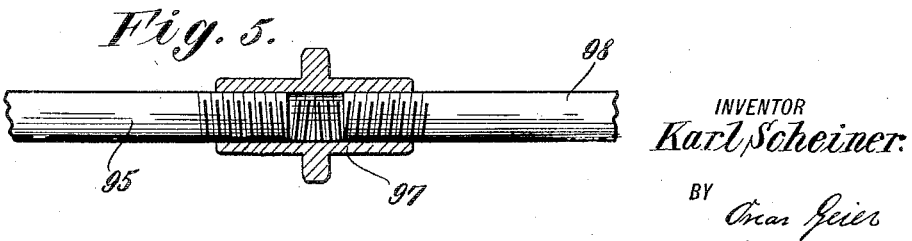
Fig. 5 is a further enlarged fragmentary view showing details of construction.

The drawings show a form of vehicle, ordinarily termed a motor-cycle, having a single wheel 10 at the front and a pair of driving wheels 12 at the rear, the latter being rigidly engaged upon an axle 14. A pair of fork arms 15 are engaged with a support casing 16 inclosing a compression spring (not shown) by which the front portion of the frame is resiliently supported. The lower ends of the forks are engaged with side plates 17 in which the front wheel spindle 18 is mounted, while pivoted in the rear ends of the plates 17 are the lower end of steering forks 20, rotatably mounted in the head 21 and operated by the steering handles 22 in the usual manner.

Pivotal connections 23 extend between the support-spring carried in the support casing 16 and the head 21. Formed with the head 21, are two angularly disposed, rearwardly extending branches 25 and 26, in the upper of which is rigidly engaged a tubular bar 27, its opposite curved end being fixed in the seat support 28, suited to contain a seat post 29 to which is attached a seat 30, the same being further engaged with a link 31 to a clip 32 fixed upon the bar 27. Extending rearwardly and downwardly from the branch 26 is a tube 34, fixed in the fitting 35, having in its lateral opening, a bar 36, the outer end of which is rigidly engaged in the support 28. From the oppositely disposed opening in the fitting 35 is extended another bar 38, the same being in alinement with the connection 34, the bar 34 having at its lower end a fitting 39 engaged with links 40 which support the pedal 42 by which the brakes are actuated.

Another tubular bar 43, set rigidly in the seat support 28 in alinement with the seat post 29, extends downwardly and is engaged with the bracket 44, the same acting as a support for the motor 45, the cylinders 46 of which extend into the space below the bar 36 and between the tubular bars 38 and 43.

A pair of foot pedals 48 are rigidly engaged upon cranks 49, the same operating upon the shaft passing through the motor casing, so that the cycle may be pedally operated at any time it may be desired, as at starting the car or to assist in locomotion upon an up-grade.

The rear shaft 14 has rigidly secured upon it a sprocket 54 operated by the chain 55 direct from the shaft, driven by the motor 45 or by the pedals 48.

Rotatably engaged upon the shaft 14 are sleeves 58, fixed at the outer ends of which adjacent to the rear wheels 12, are the brakes 60, operated by the lever 61, through the link rods 62, connecting with the brake pedals 42 so that the operator upon the seat 30 may conveniently apply or release the brakes.

So far as has been described the construction is of conventional type, the improvement consisting in the arrangement of parts about to be described.

Secured upon the sleeves 58 are a pair of raised lugs 65 and pivotally connected with the lugs are links 66 to which are connected the ends of a semi-elliptical spring 68, comprised of a plurality of leaves or layers. Attached centrally of the spring is a block 70 through which pass transverse bars 72, carrying at their ends a pair of horizontal bars 74 which constitute the longitudinal elements of the car frame.

These bars 74 have at their rear ends caps 75, while engaged upon the bars are T fittings 76 and 78, respectively at the rear and front, between which extends transverse connecting bars 77 and 79 upon which the car is secured. The T fittings 78 have secured in their through openings, in alinement with the bars 74, the ends 80 of a pair of tubular brace bars 81, bent slightly upward at the front end, eventually being firmly secured in the projections 82 formed with the seat supports 28.

In the angular openings 84 of the T fittings 78, are secured a pair of tubular braces 85 which, like the bars 81, converge toward their front ends and enter projections 87, formed with the bracket 88, having extending arms 90 secured to the bracket 44, thus providing an exceptional rigid frame.

Formed with the bracket 88 below the projection 87, is a lug 92 in which, secured on the pin 93, is a stem 95, connecting by a right and left hand screw-threaded nut or turn-buckle 97, with the central stem of a Y fitting 98, having two branches in which are engaged rods 100, their outer ends being fixed in the sleeves 58, permitting a slight change in angularity to occur, due to the action of the turn-buckle 97.

Thus there is provided a form of frame construction of unusual rigidity, capable of broadening the scope of a motor-cycle in a novel and practical manner.

Having thus described my invention what I claim as new and desire to secure by Letters Patent, is:

1. A motor-cycle frame comprising the front section of a standard frame, a rectangular, horizontally disposed carrier frame, rigid, converging connections between said carrier frame and said standard frame, and take-up means for adjustably stressing said frames in their relative position.

2. A motor-cycle comprising a single dirigible front wheel, a pair of rear wheels, an axle upon which said rear wheels are mounted, means for driving said axle, and a main frame section, of a horizontally disposed carrier frame, a single spring connected between said axle and said carrier frame, said spring being disposed in the plane of said axle, pairs of angularly disposed bars connecting said carrier frame and said main frame, diverging stress rods engaged between said axle and said main frame, and means for maintaining said stress rods in a taut condition.

3. In a vehicle, the combination with a single dirigible front wheel, a pair of rear wheels, an axle upon which said rear wheels are rigidly engaged and means for driving said axle, of sleeves rotatably journaled upon said axle, a semi-elliptical spring pivotally connected at its ends with said sleeves, a rigid rectangular frame supported horizontally on said spring, a car carried on said frame, a sectional frame carried partially by said front wheel and rigid connections between said sectional frame and the front corners of said rectangular frame.

4. In a vehicle, the combination with a dirigible front wheel, a pair of rear driving wheels and an axle shaft upon which said rear wheels are mounted, of means for driving said axle, an elliptical spring supported at its ends on said axle, said spring extending in a parallel plane above said axle, a rectangular frame carried by said spring upon which a car may be mounted, a standard frame engaged with said front wheel extending rearwardly and terminating at the seat support, branch connecting bars secured to said rectangular frame, extending toward the front and rigidly engaged in the seat support, a motor bracket carried by said standard frame, and a second pair of branch connections engaged between said rectangular frame and said motor bracket.

5. In a vehicle, the combination with a single dirigible front wheel, a standard frame in which said front wheel is mounted, a motor carried by said frame, supports upon the upper elements of said standard frame for a seat post, a pair of rear wheels, an axle upon which said rear wheels are mounted, means operated by said motor for actuating said rear axle, an open rectangular frame carried horizontally on said rear axle, an elliptical spring interposed between said axle and said rectangular frame, branched connections between said rectangular frame, their converging ends engaging with said seat support, a branched stress rod connected with said axle at its spread ends and with the motor support at the other end, and means interposed in said rod whereby it may be lengthened or shortened.

In testimony whereof I have affixed my signature.

Dr. KARL P. SCHEINER.

Copies of this patent may be obtained for five cents each, by addressing the "Commissioner of Patents, Washington, D. C."